(12) United States Patent
Freeman

(10) Patent No.: US 12,175,543 B2
(45) Date of Patent: *Dec. 24, 2024

(54) SYSTEMS AND METHODS FOR RECEIVING, SENDING AND MANAGING ELECTRONIC APPROVALS AND RECEIPTS

(71) Applicant: Michael H. Freeman, Tulsa, OK (US)

(72) Inventor: Michael H. Freeman, Tulsa, OK (US)

(*) Notice: Subject to any disclaimer, the term of this patent is extended or adjusted under 35 U.S.C. 154(b) by 0 days.

This patent is subject to a terminal disclaimer.

(21) Appl. No.: 18/130,702

(22) Filed: Apr. 4, 2023

(65) Prior Publication Data

US 2024/0112277 A1 Apr. 4, 2024

Related U.S. Application Data

(60) Continuation of application No. 17/480,470, filed on Sep. 21, 2021, now Pat. No. 11,651,444, which is a
(Continued)

(51) Int. Cl.
| | |
|---|---|
| *G06Q 40/12* | (2023.01) |
| *G06Q 20/04* | (2012.01) |
| *G06Q 20/20* | (2012.01) |
| *G06Q 20/32* | (2012.01) |
| *G06Q 20/36* | (2012.01) |
| *G09C 1/00* | (2006.01) |

(52) U.S. Cl.
CPC ........... *G06Q 40/12* (2013.12); *G06Q 20/047* (2020.05); *G06Q 20/204* (2013.01); *G06Q 20/32* (2013.01); *G06Q 20/363* (2013.01); *G09C 1/00* (2013.01)

(58) Field of Classification Search
CPC .... G06Q 40/12; G06Q 20/047; G06Q 20/204; G06Q 20/32; G06Q 20/363; G09C 1/00

USPC .......................................................... 705/30
See application file for complete search history.

(56) References Cited

U.S. PATENT DOCUMENTS

| | | | |
|---|---|---|---|
| 7,797,192 B2 * | 9/2010 | Mitchell | G06Q 20/047 705/16 |
| 8,015,086 B2 | 9/2011 | Greer et al. | |

(Continued)

FOREIGN PATENT DOCUMENTS

| | | |
|---|---|---|
| WO | 2008/103883 A1 | 8/2008 |
| WO | 2013/101244 A1 | 7/2013 |

*Primary Examiner* — Garcia Ade
(74) *Attorney, Agent, or Firm* — Howard & Howard Attorneys PLLC

(57) ABSTRACT

A system of managing electronic receipts is described herein. The system includes a point-of-sale system, a unique identifier detection mechanism, and a server. The point-of-sale system is configured to register a plurality of goods and/or services, comprising a transaction receipt. The unique identifier detection mechanism detects a first unique identifier and a second unique identifier. The server is in communication with the point-of-sale system and includes a processor configured to register the payment of the transaction receipt as a function of the first unique identifier and a memory device is configured to store a database with a plurality of receipt-data storage locations. In response to the approval the payment, the point-of-sale system forwards the second unique identifier and the transaction receipt to the server and stores the transaction receipt within the receipt-data storage location associated with the second unique identifier.

10 Claims, 3 Drawing Sheets

Related U.S. Application Data continuation of application No. 16/440,801, filed on Jun. 13, 2019, now Pat. No. 11,145,003, which is a division of application No. 14/790,422, filed on Jul. 2, 2015, now Pat. No. 10,332,214.

(60) Provisional application No. 62/020,143, filed on Jul. 2, 2014.

(56) References Cited

U.S. PATENT DOCUMENTS

| | | |
|---|---|---|
| RE44,513 E | 10/2013 | Nobrega et al. |
| 9,230,253 B2 * | 1/2016 | Johnson ............. G06Q 20/3572 |
| 2008/0313066 A1 * | 12/2008 | Sholtis ................... G06Q 30/06 |
| | | 705/35 |
| 2010/0100434 A1 * | 4/2010 | Sock ...................... G06Q 20/20 |
| | | 705/14.38 |
| 2011/0016007 A1 * | 1/2011 | Shiftan ................. G06Q 30/04 |
| | | 705/16 |
| 2012/0253915 A1 * | 10/2012 | Sock ................... G06Q 20/202 |
| | | 705/14.34 |
| 2013/0221093 A1 * | 8/2013 | Patel ................... G06Q 20/401 |
| | | 235/379 |
| 2013/0325681 A1 * | 12/2013 | Somashekar ....... H04M 15/851 |
| | | 705/35 |
| 2018/0293554 A1 * | 10/2018 | Johnson ............... G06Q 20/102 |
| 2022/0012740 A1 * | 1/2022 | Bacastow ............. G16H 10/60 |

\* cited by examiner

SYSTEMS AND METHODS FOR RECEIVING, SENDING AND MANAGING ELECTRONIC APPROVALS AND RECEIPTS

CROSS REFERENCE TO RELATED APPLICATIONS

This application is a continuation of U.S. patent application Ser. No. 17/480,470, filed Sep. 21, 2021, which is a continuation of U.S. patent application Ser. No. 16/440,801, filed Jun. 13, 2019 (now U.S. Pat. No. 11,145,003, issued Oct. 12, 2021), which is a divisional of U.S. patent application Ser. No. 14/790,422, filed Jul. 2, 2015 (now U.S. Pat. No. 10,332,214, issued Jun. 25, 2019), which claims the benefit of U.S. Provisional Application Ser. No. 62/020,143, filed Jul. 2, 2014, the disclosures of which are hereby incorporated by reference in their entirety.

TECHNICAL FIELD

The present invention relates generally to the internet, closed networks, electronic and computer arts, and, more particularly, to apparatuses and methods for receiving electronic payment receipts and management of the electronic receipts, whether at a Point-of-sale terminal or for on-line purchases. Under this invention, either in real-time (before) or afterwards, the Cardholder can manage the approval/disapproval and/or the record of the transaction.

COPYRIGHT NOTICE

A portion of this disclosure contains material that is subject to copyright protection. The copyright owner has no objection to the facsimile reproduction by anyone of this patent document as it appears in the U.S. Patent and Trademark Office, patent file or records, but reserves all copyrights whatsoever in the subject matter presented herein.

BACKGROUND OF THE INVENTION

Cards which can be read electronically, typically through a magnetic strip, chip or embedded circuit, are commonplace in our society. However, currently, paper print outs of a transaction, such as a consumer/merchant purchase, are the norm. Occasionally, at the point-of-sale, a consumer, user or a "Cardholder" for the purposes of this invention, may select an electronic receipt be sent to his or her email by typing in the email on the point-of-sale transaction device/terminal machine. However, this presently exists only on a transaction by transaction basis, elected in real-time, each time, by the customer, in conjunction with only the reader point-of-sale device. Further, there is no general consensus on how, when or where the information is sent or stored.

Thus, the present invention provides for both the technical method and system for enabling the Card to have a specific and unique identifier, which triggers an electronic copy of the receipt to be sent to one or more locations, stored in one or more locations, or otherwise made available to the Cardholder or other person with permission in electronic format. It is an object of the present invention to address or at least ameliorate some of the above disadvantages.

SUMMARY OF THE INVENTION

In the present application, a system of managing electronic receipts is described. The system comprises a point-of-sale system, a unique identifier detection mechanism, and a server. The point-of-sale system is configured to register a plurality of goods and/or services, wherein the plurality of goods and/or services comprises a transaction receipt. The unique identifier detection mechanism is in communication with the point-of-sale system and is configured to detect a first unique identifier linked with the user payment device and detect a second unique identifier linked to the user upon approval of the payment. The server is in communication with the point-of-sale system and includes a processor and a memory device. The processor is configured to register the payment of the transaction receipt as a function of the first unique identifier. The memory device is configured to store a database with a plurality of receipt-data storage locations and each receipt-data storage location is associated with a second unique identifier. In response to the approval of the payment, the point-of-sale system forwards the second unique identifier and the transaction receipt to the server and stores the transaction receipt within the receipt-data storage location associated with the second unique identifier.

In another aspect of the invention, a method of managing electronic receipts is described. The method comprises the steps of: registering, through a point-of-sale system, a plurality of goods and/or services, the plurality of goods and/or services comprising a transaction receipt; detecting, through the point-of-sale system, a payment through a user payment device; detecting, through the unique identifier detection mechanism in communication with the point-of-sale system, a first unique identifier linked with the user payment device; registering, through a processor within a server in communication with the point-of-sale system, the payment of the transaction receipt as a function of the first unique identifier and in response: detecting, through a unique identifier detection mechanism, a second unique identifier linked with the user; forwarding the second unique identifier and the transaction receipt to the server, the server including a memory device configured to store a database with a plurality of receipt-data storage locations, each receipt-data storage location associated with a second unique identifier; and storing the transaction receipt within the receipt-data storage location associated with the second unique identifier.

BRIEF DESCRIPTION OF THE DRAWINGS

Other advantages of the present invention will be readily appreciated as the same becomes better understood by reference to the following detailed description, when considered in connection with the accompanying drawings.

Corresponding reference numbers indicate corresponding parts throughout the drawings.

DETAILED DESCRIPTION OF THE INVENTION

With reference to the drawings and in operation, the present invention overcomes at least some of the disadvantages of known banking systems and methods providing a system and method of managing electronic receipts through the use of multiple unique identifiers.

Selected embodiments of the present invention will now be explained with reference to the drawings. It will be apparent to those skilled in the art from this disclosure that the following description of the embodiments of the present invention is provided for illustration only, and not for the purpose of limiting the invention as defined by the appended claims and their equivalents.

Referring to the figures, where like numerals generally indicate like or corresponding parts throughout the several views, the systems and methods are constructed in accordance with the invention.

Figure 1:
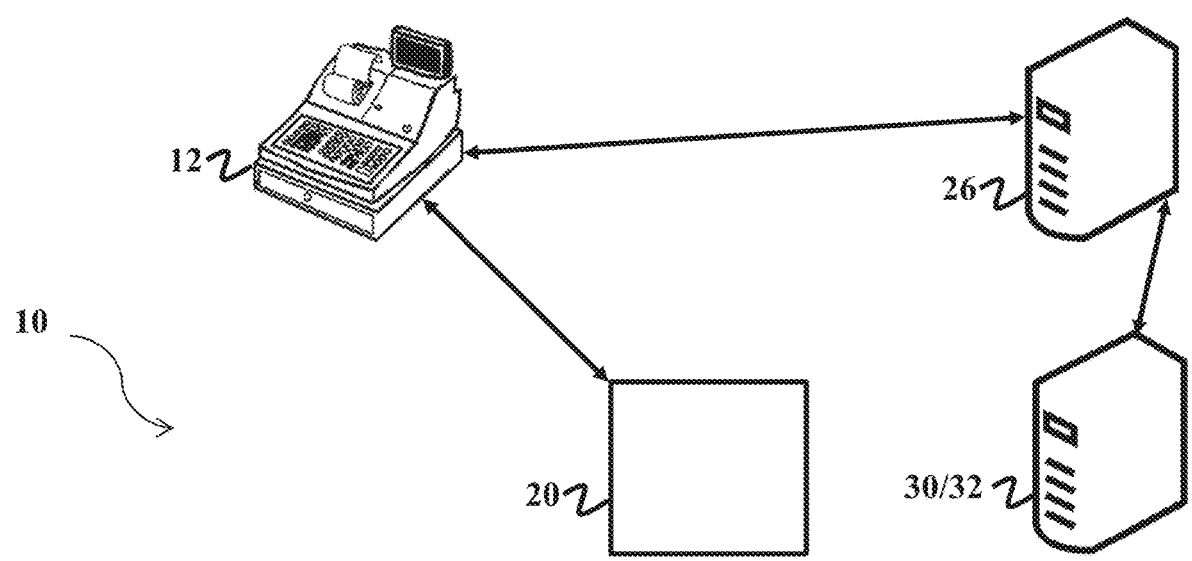
FIG. 1 is an image of the system described within the present disclosure.

FIG. 1 shows a system 10 of managing electronic receipts. The system 10 comprises a point-of-sale system 12, a unique identifier detection mechanism 20, and a server 26. The point-of-sale system 12 is configured to register a plurality of goods and/or services 14 and the plurality of goods and/or services 14 comprises a transaction receipt 16. The goods and/or services 14 can describe any combination or inventory of items or products that are provided by the merchants for purchase by the user. Non-limiting examples of products may include retail food items, retail consumable goods (clothing, home items), or particular large-scale items such as electronics or furniture. Services may also include restaurant food items and/or personal care services including hair care, skin care, spa treatments, or exercise services. The common factor between the goods and/or services 14 is that they are regularly acquired by a user during interaction with the merchants that are utilizing the system 10 and that these goods and/or services 14 may be itemized through the transaction receipt 16.

The unique identifier detection mechanism 20 is in communication with the point-of-sale system 12 and is configured to detect a first unique identifier 22 linked with the user payment device 18 and detects a second unique identifier 24 linked to the user upon approval of the payment. The unique identifier detection mechanism 20 may communicate with the point-of-sale system 12 through either a wired or wireless network. Traditionally, the unique identifier detection mechanism 20 may be incorporated into a standard magnetic strip or credit card chip reader machine, but may also be fully integrated into the point-of-sale system 12 itself. The first unique identifier 22 may take the form of a traditional credit card number or credit account information, but may also take any other forms that allow the system 10 to confirm the identity of the user. Multiple first unique identifiers 22 may also be utilized by the system 10 in order to provide additional security surrounding the identity of the user. The second unique identifier 24 provides a unique approval signature for the user payment device 18 used by the user. This approval is traditionally associated with the user payment device 18 and is given by the bank and/or Credit Card Company that issued the payment device. The user payment device 18 may comprise a traditional credit or bank debit card, but other banking/payment methods and/or device may also be used with the system 10 (as discussed further below).

The server 26 is in communication with the point-of-sale system 12 and includes a processor 28 (not shown in FIG. 1) and a memory device 30. The processor 28 is configured to register the payment of the transaction receipt 16 as a function of the first unique identifier 22. The memory device 30 is configured to store a database 32 with a plurality of receipt-data storage locations 34, each receipt-data storage location 34 associated with a second unique identifier 24. As shown in FIG. 1, the server 26 may be housed within an individualized server incorporating the processor 28, but the server 26 may also comprise separate components (including the processor 28 and the memory device 30) that communicate over a wired/wireless network (also shown in FIG. 1). The database 32 and the plurality of receipt-data storage locations 34 are used in order to store the appropriate transaction receipt 16 that is associated with the correct user.

In response to the approval the payment, the point-of-sale system 12 forwards the second unique identifier 24 and the transaction receipt 16 to the server 26 and stores the transaction receipt 16 within the receipt-data storage location 34 associated with the second unique identifier 24. This transfer of the transaction receipt 16 to a receipt-data storage location 34 ensures that the user has access to the transaction receipt 16 at a later date or time. The association of the receipt-data storage locations 34 with the second unique identifier 24 ensures that the user can track their transaction receipt 16 and provides a layer of security within the database 32.

In another embodiment, each second unique identifier 24 has more than one associated receipt-data storage location 34, and the processor 28 is further configured to store the transaction receipt 16 within each associated receipt-data storage location 34. This allows for multiple transfers of the information within the transaction receipt 16 to different receipt-data storage locations 34, some of which may be coded for different users and associated with different user payment devices 18 that are all associated with the user.

In another aspect of the invention, the user payment device 18 comprises a credit/debit card including a magnetic strip or chip. Traditional credit cards utilizing magnetic strip and payment chip technologies may be used in addition to other wireless payment technologies. These cards used as user payment devices 18 may also be used for non-payment merchant services, as well.

In another aspect of the invention, the user payment device 18 comprises a wireless computing device 36 in communication with the point-of-sale system 12 and the server 26. Here, the wireless computing device 36 may comprise any type of cellphone, tablet computing device, laptop computer, or wearable device that allows for the functionality and communication between the wireless computing device 36 and the point-of-sale system 12 and/or the server 26.

In another aspect of the invention, the wireless computing device 36 further includes a memory device 38, the memory device 38 including at least one receipt-data storage location 40. The wireless computing device 36 receives the transaction receipt 16 associated with the second unique identifier 24 and stores the transaction receipt 16 within the at least one receipt-data storage location 40. As discussed above, the database may be housed separately and communicate directly with the wireless computing device 36. This allows for a user to capture the transaction receipt 16 onto their device without needing to depend on a database that is maintained by the merchant or their own user payment device 18 provider (i.e., Bank or Credit Card Company). There is an additional element of security with the user keeping the transaction receipt 16 and all associated information within their own personal hardware device.

In another aspect of the invention, the transaction receipt 16 may be divided and cataloged into different categories 42 of goods and/or services by the user within the receipt-data storage location 34/40. Such categories 42 may be related to the goods and/or services, or can be related to particular shopping characteristics related to the user in order to effectively sort all purchases at some later date. The categories 42 may be also be generated algorithmically in real-time or predefined by the user.

In another aspect of the invention, the database 32 comprises a relational database and each receipt-data storage location 34/40 further includes related user information 44, the processor 28 further configured to store the transaction receipt 16 as a function of the receipt data information 44.

In another aspect of the invention, the processor is further configured to: select a transaction receipt 16 from the receipt-data storage location 34/40 within the database 32; generate an expense report 46 as a function of the transaction receipt 16 within the receipt-data storage location 34/40; and attach an image copy 48 of the transaction receipt 16 to the generated expense report 46. The image copy 48 may be in any suitable image file format including, but not limited to, JPG, TIF, PNG and GIF. Such file format offers versatility and compatibility with other systems.

Figure 2:
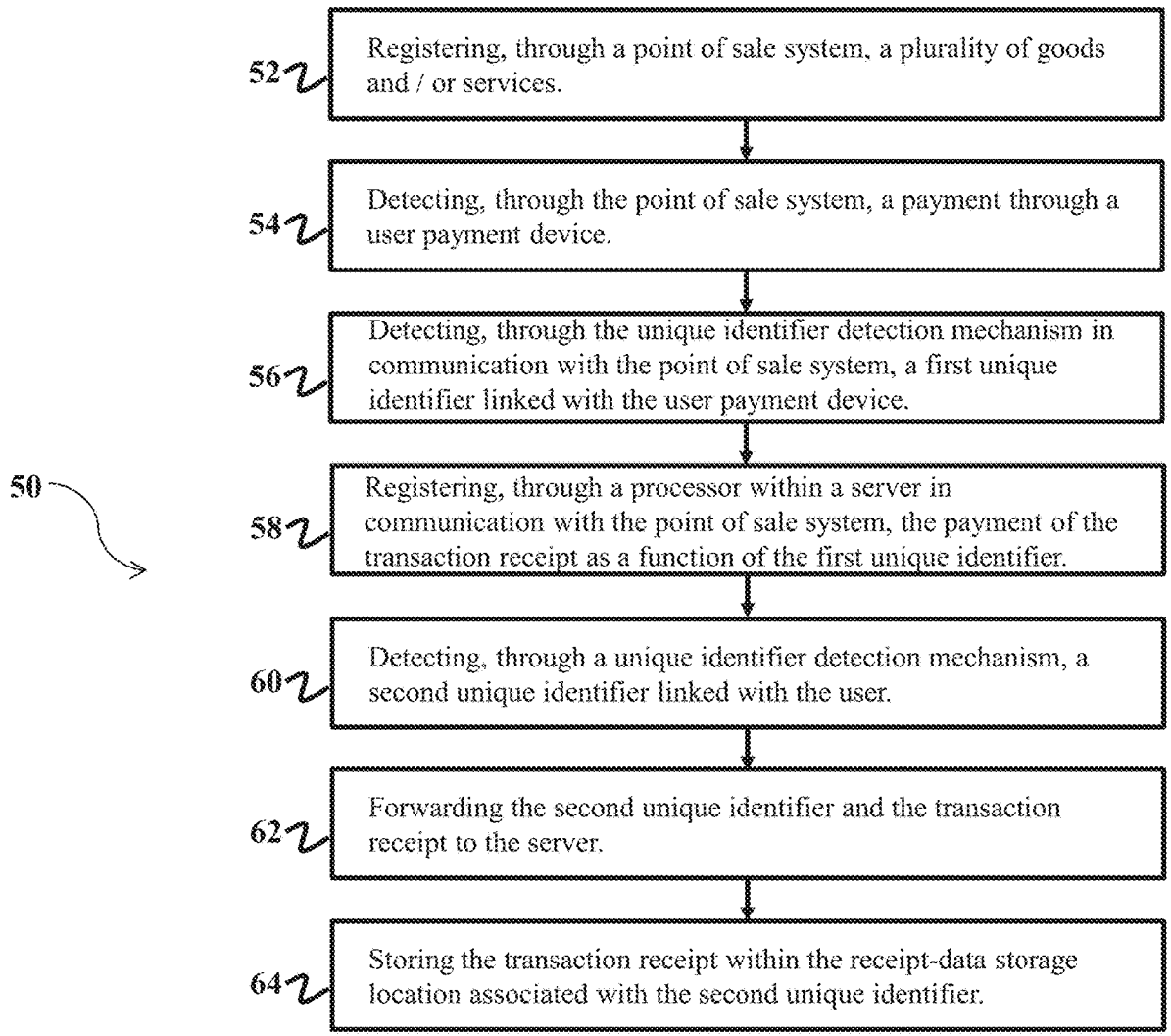
FIG. 2 is a flowchart detailing the method within the first embodiment of the present disclosure.
Figure 3:
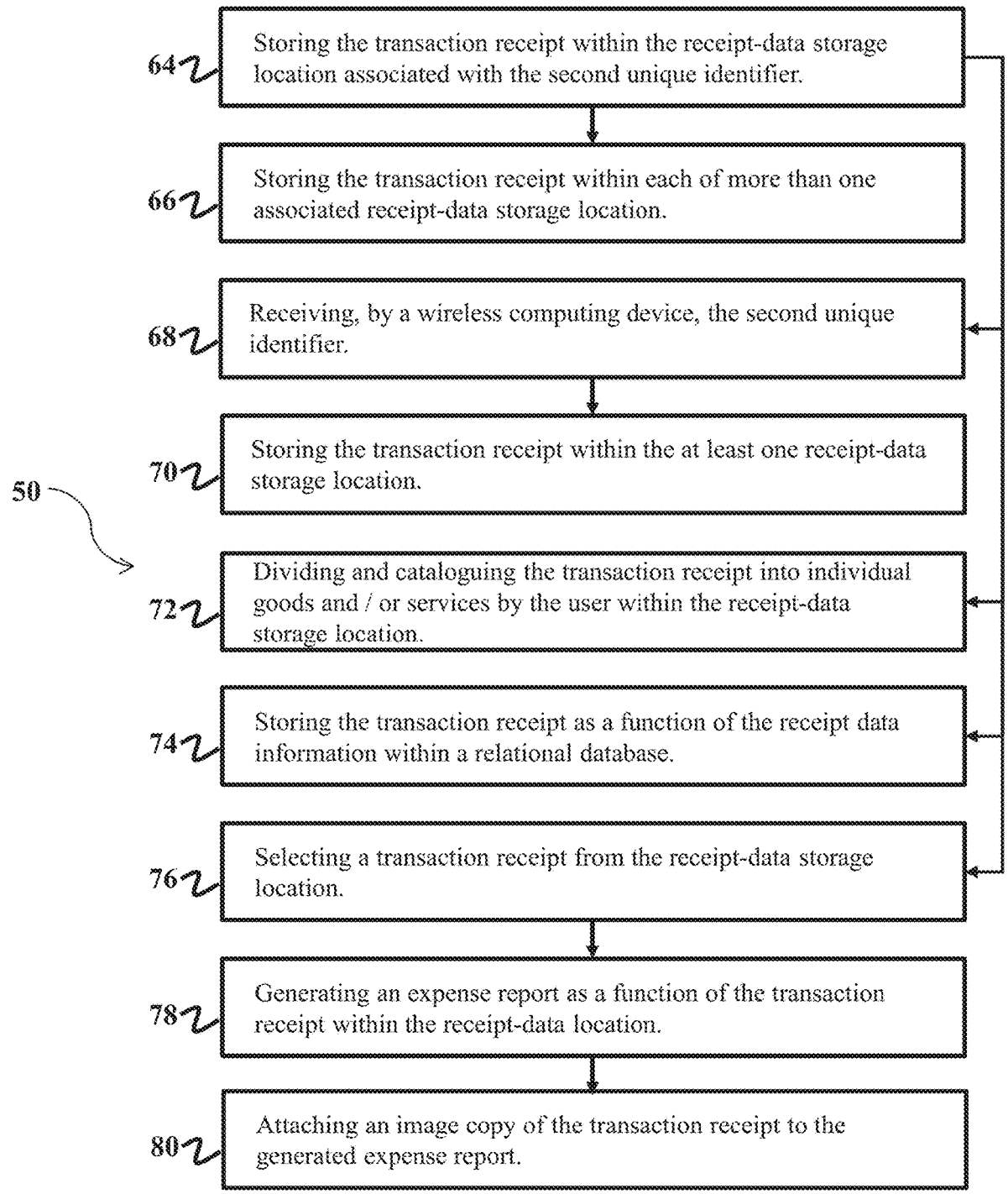
FIG. 3 is a flowchart detailing the method within additional embodiments of the present disclosure.

In another aspect of the invention, as displayed within FIGS. 2 and 3, a method 50 of managing electronic receipts is described. The method 50 comprises the steps of: registering 52 through the point-of-sale system 12 a plurality of goods and/or services 14, the plurality of goods and/or services 14 comprising a transaction receipt 16; detecting 54 through the point-of-sale system 12, a payment through a user payment device 18; detecting 56, through the unique identifier detection mechanism 20 in communication with the point-of-sale system 12, a first unique identifier 22 linked with the user payment device; registering 58, through a processor 28 within a server 26 in communication with the point-of-sale system 12, the payment of the transaction receipt 16 as a function of the first unique identifier 22 and in response: detecting 60, through a unique identifier detection mechanism 20, a second unique identifier 24 linked with the user; forwarding the second unique identifier 24 and the transaction receipt 16 to the server 26, including a memory device 30 configured to store a database 32 with a plurality of receipt-data storage locations 34, each receipt-data storage location 34 associated with a second unique identifier 24; and storing 64 the transaction receipt 16 within the receipt-data storage location 34 associated with the second unique identifier 24.

In another embodiment, the user payment device 18 comprises a wireless computing device 36 in communication with the point-of-sale system 12 and the server 26. The wireless computing device 36 further includes a memory device 38, the memory device 38 including at least one receipt-data storage location 40, the method further including the step of receiving 68, by the wireless computing device 36, the second unique identifier 24 and storing 70 the transaction receipt 16 within the at least one receipt-data storage location 40.

In another aspect of the invention, the method 50 further includes the step of dividing and cataloguing 70 the transaction receipt 16 into individual goods and/or services 14 by the user within the receipt-data storage location 34/40.

In another embodiment, the database 32 comprises a relational database and each receipt-data storage location 34/40 further includes related user information 44, the method further including the step of storing 72 the transaction receipt 16 as a function of the receipt data information 44.

In another aspect of the invention, the method 50 further includes the steps of: selecting 74 a transaction receipt 16 from the receipt-data storage location 34/40; generating 76 an expense report 46 as a function of the transaction receipt 16 within the receipt-data location 34/40; and attaching 78 an image copy 48 of the transaction receipt 16 to the generated expense report 46.

Industrial Application: The following paragraphs cover several industrial applications of the system 10 and method 50 and how they allow for the transfer of electronic receipt information.

In another embodiment, this invention covers the specific identifier(s) that reside on the card, the means and method for the reader to identify the same, and the instructions, once that specific identifier is recognized by the system, to create an electronic file for further handling. Thus, this invention covers the means to create the specific identifier on the card, the means for the terminal or on-line, or voice processing software/hardware to recognize the specific identifier, and then, the processing system's software/hardware (at any point in the process) and/or database to take the action to create the electronic file of the transaction and make the electronic copy of the transaction available for further sending, holding, storing, or other use, including sending directly via available mobile, Wi-Fi or similar, or internet or similar connection directly to the Cardholder's device, such as a computer, smart phone, phone, tablet, laptop or other memory storage connected device.

It is the purpose of this invention to teach how a Cardholder can obtain electronic receipts of transactions, and also manage Card/mobile device use and authorization of the Card.

In addition, any intrinsic attributes of the sale, which may or may not already be extant on the card or in its reading or its processing, can be used as the specific identifier which signals the system to create an electronic copy of the transaction. For instance, the type of card used (i.e. a Visa card), could be used as the command to the system that an electronic copy of the transaction is to be created. Another example may be that the identity and/or code of the Issuer can be used to command the system that an electronic copy is to be made. Likewise, the identity of the processing system or Processor can be the trigger to send the signal. In its fullest form, the invention here shows that just the existence of a card with its existing intrinsic attributes can serve as the signal or command for the processing system that an electronic copy is to be created for further processing.

In another aspect of the invention, the Cardholder or the issuing authority of the Card, identifies a specific instruction, a unique specific identifier from the card information, to identify a transaction, enable the electronic information to be retrieved, stored and sent to one or more locations, as triggered by one or more specific and unique identifiers residing on the card.

In this way, a Cardholder does not have to keep every paper receipt received from a point-of-sale, mobile or internet or online or call-in transaction, and can have easy access to a saved electronic file of the transaction, initiated by the card being swiped, the card information being typed in (either by the Merchant or the Cardholder or authorized person) or the card information being spoken or given on a call.

In another embodiment of the invention, the card, of whatever type, has a specific identifier, whether it be bits, bytes, electronic, magnetic, stamped or other method, like audio (like a voice print) or visually (optically like OCR or infrared) embedded, signaling and retrievable and/or readable information by the terminal or processing device, including information which can be typed into internet type purchases, or where the merchant must type in a number instead of swiping the card, which notifies the processing software/hardware, or a connected database, that the Cardholder or other entity with permission, wants to have an electronic copy of the transaction sent to an email, sent to another addressable location, or stored for accessing electronically by the Cardholder or other party with permission. In this context, the specific identifier could be a bit or byte, an alphanumerical identifier, or any other known method for a card reader and/or processor to process information electronically or manually, together with or after the actual transaction.

In addition, the "trigger" for the processing system to understand that an electronic copy of the transaction is to be created for further handling, storage, or sending, can be based on the type of device the transaction was made on. Thus, for instance, a cell phone company can potentially charge a fee for having all processing systems understand that mobile purchases always require an electronic copy to be created to be held, stored, sent or otherwise handled according to the agreement between the user and the device company, including sent to the device itself.

It is the further purpose of this invention to teach how a Cardholder or Card Issuer can pre-register, post-register, or simultaneously register an email, web address, network address, device, or other internet accessible location or private network, for the sending of an electronic receipt for all receipts. In an alternative version of the invention, the Card Issuer or the Processor holds all electronic receipts until a Cardholder signs up to receive them.

In this fashion, the Cardholder always receives electronic copies of the receipts, which are helpful and beneficial for storing, data manipulation, and things like filling out expense or tax reports. By having a unique ecReceipt identifier on the card, chip or card/device circuit itself, which is read by the point-of-sale system and processed by the processing software/hardware, the system understands that the Cardholder has selected the option of having all transactions sent to place like a specific email address, or a web location or his/her device.

This, then, obviates the need for a Cardholder to plug in an email address each time, in real-time, when a card transaction is processed. In addition, the unique ecReceipt identifier may also signal the processing software and database that electronic receipts should be sent to multiple locations and/or emails as selected by the Cardholder, which can be "sliced and diced" according to the intrinsic attributes of the transaction and the choices of the Cardholder.

Ultimately, the specific identifier to receive electronic receipts can be the actual card, card type or issuance itself. In this case, when the card is presented, the processing system would recognize that an electronic receipt or other management is to be permitted, just by virtue of the intrinsic attributes of the card itself.

The added value to a Cardholder and the Card Issuer is that by providing exact electronic replicas of each paper transaction, card companies can keep calls down, and fraud may be detected by Cardholders earlier and easier. Calls to the Card Issuer involving handling each call costs $5 to $10, and in the aggregate, runs in the tens of millions of dollars, if not hundreds of millions of dollars for the issuers to handle questions on calls about purchases. In addition, fraud will be reduced and better monitored, because a Cardholder can see the entire transaction, and better identify a forgotten transaction from a fraudulent one. Currently, a Cardholder only sees a total with often non-descript terminal information concerning the transaction on a bank or monthly card statement, while with the ecReceipt, an electronic copy of the entire transaction is made available to the Cardholder. In addition, with the transferability and forwarding opportunities of this invention, of the electronic information to things like accounting formats, expense reports, and electronic tax forms, a Cardholder can more easily accumulate the information and make it usable, than with paper receipts.

Types of cards and systems which can utilize this invention include, but are not limited to, ATM cards, bank cards (credit and debit cards including VISA, MasterCard, Discover and American Express, to name a few examples), gift cards, loyalty cards, prepaid cards, driver's licenses, telephone cards, membership cards, medical cards, electronic benefit transfer cards (e.g., food stamps), and other payment cards, Point-of-Sale systems, internet card processing protocols, secure eBanking devices, authentication tokens, and machine identification modules (MIM).

In another embodiment of the present invention, the system may also be used with secure ID documents including ePassports, eTD cards, eHealth cards, as well as eDrivers' or Driver's licenses with magnetic stripes, chips or other methods for recorded information, as well as all other types of cards which can be read at any type of reader terminal, or used over the internet for internet purchases, private purchases within a network, registrations, or other logins, including nearly any application in which value or secure information is not stored on the card itself, including smart card contact or contactless (RFID) cards and interfaces.

Also, the invention can be used with cards which are known as "smart" cards, chip cards (such as an EMV chip card), or any type of integrated circuit card ("ICC") that is any card with an embedded integrated circuit that holds or stores information. Also, any Universal Integrated Circuit Card ("UICC") which is the smart card used in mobile terminals in GSM and UMTS networks can be used by this invention.

In the case of the UICC, it resides in a person's cell phone or other personal device, and ensures the integrity and security of all kinds of personal data. In this case, a smart phone or smart device owner's email address or other internet accessible location address, could also be stored in the UICC, and things like phone bills can be electronically sent to the phone user's email address. Also, cell phone device and service providers could send electronic messages or advertising to the smart phone or smart device owner's email address. Two additional categories of cards which are included under this invention, but by no means are exclusive or exhaustive of the types of cards or transactions which can use this invention, are dual-interface cards and hybrid cards. A hybrid card has two chips, one with a contact interface and one with a contactless interface. The two chips are not interconnected. A dual-interface card has a single chip with both contact and contactless interfaces. With dual-interface cards, it is possible to access the same chip using either a contact or contactless interface with a very high level of security.

Also included in this invention are credit cards using "contactless" technology that allows users to pay for merchandise by holding the card near a special reader, instead of swiping it or handing it to a clerk. In this instance, additional contactless readable information by the reader from the card would trigger the system to understand that an electronic copy of the transaction is to be held, sent or otherwise manipulated per the Cardholder or other entity with permission instructions. The announcement of new "blink" cards by JPMorgan Chase & Co. marks the first push to introduce the cards to U.S. consumers on a wide scale. This technology is already in use to some extent in Europe and Asia. Included in the "blink" cards would be a unique identifier which would be read by the system and trigger the creation of an electronic copy of the transaction to be made for further handling in accordance with the disclosures herein.

For reference, conventional credit/debit cards, smart cards are made of plastic, generally polyvinyl chloride, but sometimes polyethylene terephthalate based polyesters, acrylonitrile butadiene styrene or polycarbonate, or other substances such as paper. Smart cards can provide identification, authentication, data storage and application processing, and under this invention would provide a unique specific identifier which would notify and trigger the processing system, at some point during the transaction, or afterwards, to understand an electronic copy of the transaction needs to be created and sent to an email or other location or held for further use, either within a network, or to be able to be downloaded to another computer, storage device or system.

Likewise, smart cards may provide strong security authentication for single sign-on ("SSO") applications within large organizations. The present invention can also be used with these type of "chip" cards, one in which the information is stored on the card itself and read by the point-of-sale terminal, or plugged into an online credit card processor system. In any of these cases, the card possesses a unique specific identifier, which is readable or writable (as in the instance of typing in information for an internet purchase). The specific identifier notifies the processing system software/hardware and/or database to create an electronic copy of the transaction and make it available to a predetermined location, or a location which can be determined afterwards. This location would be like an email, where the copy of the transaction would be sent to a Cardholder's email, or other internet address. Or, the electronic copy of the transaction could be held, or made available by any party in the processing chain, or to a third party, for transfer to the Cardholder or other entity with permission. For instance, the copy of the ecReceipt would be mailed to the Cardholder's email address. Or, the ecReceipt would be sent to a third party software database, which could be accessed by the Cardholder, and then manipulated for tax returns, general accounting, or to populate expense reports. In each case, the database could have available not only specific top level information about the transaction, like date, type of purchase and amount, but would also be able to produce, like to print or send electronically, the actual receipt as, for instance, an attachment to an expense report.

The chips used in all of these cards are either RFID, microcontroller chips and/or memory chips, each of which has the ability to store and reproduce for reading by a terminal or other device a unique identifier which is the "trigger" mechanism, whereby a copy of the transaction is created in electronic format for further handling in accordance with the disclosures herein.

Each of the last mentioned above cards includes memory akin to a small floppy disk, as opposed to being located on a magnetic stripe. Memory chips are less expensive than microcontrollers, but with a corresponding decrease in data management security. RFID are the cheapest of all. Cards that use memory chips depend on the security of the card reader for processing and are ideal for situations that require low or medium security. A microcontroller chip can add, delete, and otherwise manipulate information in its memory. A microcontroller is like a miniature computer, with an input/output port, operating system, and hard disk. Thus, each of these types of cards can be set to have a unique specific identifier, whereby the Cardholder or other entity with permission, can receive or have access to an electronic copy of the transaction. In addition, the specific identifier, in conjunction with the processing software/hardware and database can be enabled to send or hold an electronic copy of the transaction, which multiple copies may be of all of the transactions by the card or any select subset of the same.

Smart cards with an embedded microcontroller have the unique ability to store large amounts of data, carry out their own on-card functions (e.g., encryption and digital signatures) and interact intelligently with a smart card reader. The information that the Cardholder has selected to receive an electronic receipt may be located in either of these chips, in any memory location existing on the smart card. This specific electronic receipt information and trigger can be originally written into the card information when issued, or cards which have rewriteable information storage space, could also house the exact email address, rather than have a trigger located on the card, which is then interpreted by the processing software to understand, locate and send an electronic receipt.

In addition, any card which has sufficient memory can also send electronic receipts to multiple emails or other locations based on information and instructions that are stored on the card and then processed by the reader and processing software/hardware.

In another aspect of the invention, the reader and processing system can also be programmed to report, send and/or place an electronic copy of the transaction back onto the SIM, Chip or RFID device, so that the card itself contains an electronic copy of the transaction which can be downloaded by the Cardholder. This is also true of a computer, smart phone, phone, mobile device, laptop, tablet or other connected device, where the specific identifier can be set to return the electronic copy of the transaction directly to a selected device, either the one involved in the transaction, or another chosen by the Cardholder or permitted entity, such as an employer.

In fact, many video game and amusement centers now use debit card systems based on magnetic stripe cards, where this invention may be utilized.

In another aspect of the invention, a mobile device, when used for transactions, like with a mobile wallet, can use the unique identifier to distinguish between several cards held in a mobile wallet.

In addition, for enhanced security, and when used with smart cards or "active" type cards, such as Near Field, RFID cards, smart card, Blue Tooth card, or other card, which can be read by the mobile device, either wired or wirelessly, an added feature will exist where a security check and/or approval check can be run when combined with a mobile device and the unique specific identifier.

Under this aspect of the invention, the mobile phone, or other enabled mobile device, like a smart phone or a tablet, when used as a mobile wallet, would communicate with the actual credit/debit/other type card on the person and check electronically using the specific identifier on the card, to verify that the mobile phone and the card are within a certain selected proximity. If the proximity exists, then the transaction is permitted; if not, the transaction is denied. Thus, if someone stole a mobile device, they would not be able to conduct a mobile wallet transaction unless the card was also in proximity, as the mobile wallet would electronically (either wire or wireless) seek the specific identifier and the preset proximity, so that only a successful "ping" would enable the mobile wallet transaction to be approved.

This is contemplated that this could be a one step or multistep process where the mobile phone enables the transaction, due to recognition of the specific identifier on the card, and then "pays." This can be automated or set to manual user selection when the existence of the card interacts with the mobile phone and either permits or does not permit the transaction.

Thus, in one embodiment of the invention, if the mobile device has all of the card information residing on the phone, or sufficient card information resides on the mobile device, then it would still take the physical proximity, and enablement of the mobile device to "ping" the card, in order for the information to be presented for the transaction.

In addition, the mobile device can also receive a signal from the Issuing Bank, based on the specific identifier, which in this instance can be the card number, and the mobile device can receive a signal that the limit of the credit has been reached and/or exceeded, thus, the card, or its facsimile, could "grey out" on the mobile device, or some similar signal like a black-out or other message, to indicate to the Cardholder and use that this specific card is no longer available for use. This could be accomplished with another type of signal or message to the mobile device besides "graying out" the representation of the card.

Thus, under this aspect of the invention, the mobile device would begin the transaction, but before completing, it would check through Blue Tooth or some other wire or wireless technology (either communicating in a wireless setting, or connected, like having an external device connected to the mobile device). In this fashion, if a mobile device, like a phone is lost, the credit cards cannot be used. Under this concept, the phone does not really have any credit card information at all, it cannot do a transaction itself. The card really does the transaction. However, a mobile wallet must have the card in physical proximity or connected, or the transaction cannot be initiated or completed. In this fashion, the personal and unique identifier would be the specific code on the card, that would prevent a mobile device from clearing a transaction from someone else's card.

In addition, another aspect of this invention is that when used in a mobile device configuration, even if a smart card is not present, the specific identifier on the magstripe card can signal an electronic copy of the receipt, and, before the receipt, a notification of the authorization is being accessed can be sent to the mobile device, such as a text or email, or other signal whereby the user can press a button or process a signal to either approve or disapprove the sale. In this context, the manual approval by the mobile device holder would serve as the signal. In this feature of the invention, if a parent permits a child to use a card, whether a smart card or magnetic stripe card, or bar code card, or 1 D, 2 D, 3 D or color bar code cards, or any card, the specific identifier can also trigger a text, email, call, electronic signal or other alert to the mobile device, whereby the Cardholder can electronically, through a mobile device or even a static device like a laptop, television or other electronic device, send a return signal to either approve or decline the transaction.

Under this aspect of the invention, there is a new "superintending" control, that may be exercised by the Cardholder, or that may be different from the Cardholder, another person with permission, including something like an automated system, like a database with preset approval/denial triggers. All this increases security provided over transactions, invisible or visible to the Issuing Bank, which are necessary before the transaction is finally approved for settlement by the processing system and network of parties. Under this aspect, the Cardholder can initiate a personal card management tool, where the Cardholder or other with the Cardholder's permission can select to approve or deny the card, even, in one instance, before the Issuing Bank knows that the transaction has been attempted. Again, this can be a preselected set of unique attributes, can be automated, by virtue of amount, type of transaction, or location, to name a few, so that if denied, the Issuing Bank is unaware of the transaction. In this aspect of the invention, the specific identifier creates the approval/disapproval process independently from the approval by the Issuing Bank, and in one aspect of the invention, there would be a firewall between the knowledge base of one from the other.

Thus, one aspect of the invention is the real-time receipt of one or more intrinsic attributes of the transaction, where normally an entity, like a company, only knows what the exact transaction is when they get their bill.

Also, by utilization of one or more special identifier(s) on the card, the Cardholder or entity with permission, can essentially have a data management tool, and pre-select or post-select on multiple intrinsic items present in card transactions covering multiple intrinsic attributes before the approval and/or denial of the Issuing Bank or afterwards.

Likewise, the Cardholder or "Supervisor" can signal the card to use another card for the transaction automatically, by having more than one card registered with a specific identifier. In this fashion, a Supervisor could have a salesman on a trip use one card for beginning the process, and then signal the processing software/hardware to convert the sale to another card on file, or another form of credit, such as a credit line, which is on file.

It is also the teaching of the present invention to instruct that not only can this invention be used for typical card purchases of any kind, but also with any other type of card transaction, such as sending a bill, payment of a bill, or issuance of a medical report using something like an eHealth card, eDriver's licenses ticket, fines or other transactions could also send an electronic copy of the specific transaction to the Cardholder.

Included in the term "unique specific identifier" or "specific identifier" would be any method of communication initiated by swiping, or electronic or visual reading, typing or speaking the card information, when in connection with interfacing with the payment terminal, internet transaction or over the phone placement of an order with a card. The transfer of one or more specific identifiers can be by any known method, such as analog, digital, near-field, infrared, RFID, Blue Tooth, RF, optical/OCR, or the like, including any other method of transmission of information, including frequencies other than RF. This specific identifier can also be located on a device, like a smart phone, and transmitted to a reader, as well as be resident on the card.

In the case of magnetic stripe cards, either the card number, or in addition to it, a card security code, or in addition to it, another stripe, portion of a stripe, embedded chip, OCR, RFID, infrared, near-field communication protocol, Blue Tooth, or similar apparatus would contain the specific identifier, resident on the card. As an example of how the specific identifier can be incorporated into the card, it can reside in the card number, a new number, including a new number which is a part of the card number or added to the card number, or a new number altogether. It can also be the PIN number, added to the PIN number, or be included with or added to the card security code. Thus, under this invention, any method which would provide either a Point-of-sale terminal reader, or which could be typed into an online transaction, or spoken over a call, could be used to case the system to identify that an electronic copy of the transaction is to be created and then emailed, or held or sent for further use in accordance with the disclosures herein.

Typically, in a PoS which would engage with the payment terminal to identify to the payment terminal that not only is a paper copy of the transaction to be made, but in addition, or alternatively, instead of, an electronic copy of the transaction is to be created and sent to the predetermined email or cardholder accessible address, or the email could be provided after the transaction. In this way, any combination of when the electronic receipt is held, sent, or made available could be in any time sequence.

Mobile phones, tablets and other devices' readers are included in this invention. For instance, five mobile computer makers support BizTalk RFID Mobile in their devices: Intermec, Motorola (MC9090), PsionTeklogix, Samsung and Unitech (RH767). In December of 2010, Samsung Electronics Co. Ltd. has announced a near field communications (NFC) chip with embedded flash memory intended for use in mobile handsets. The company claimed that its part is the first NFC device to offer embedded non-volatile memory. This would allow developers to upgrade software or firmware. One upgrade would be the software/hardware enablement to be able to read the specific identifier when the card is swiped, typed or spoken. In June, 2012, Samsung announced the launch of its own official near-field communication (NFC): TecTile "smart tags" for the Galaxy S3. The NFC stickers work with its Galaxy S3 and Galaxy Note 2. The stickers can be used for certain phone functions, which can include the identification of the specific identifier which triggers the receiving and/or processing system to create an electronic copy of the receipt for further handling in accordance with the disclosures herein. In addition, by swiping a phone over a tag, the user can notify a cardholder that he wants an electronic copy to be held, stored, and/or sent, in accordance with the disclosures herein, automatically. This would be true of any smart device which can read information and send it via the internet, such as an iPad or tablet with a smart tag.

The invention can also be enabled in mobile wallets, where a specific identifier is communicated together with the payment information to trigger the mobile and processing system to understand that a command has been sent to create an electronic copy of the transaction which then can be emailed, texted, stored in the SIM card for future downloading, or forwarding to a database for further use, and the like.

In addition, when transactions occur in connection with computers, or mobile devices, like, for instance, smart phones, phones, tablets, and/or laptops the specific identifier can be programmed to command that the processing system, in addition to, or in lieu of an email or other storage location, return an electronic copy directly to the device via whatever connection is available (i.e., mobile system, Wi-Fi, internet) for further handling by the user.

In this context, the electronic receipt can be received as an individual data file, or be programmed to be dumped, according to further commands resident in either the processing system, the device system or a combination of the two, directly into an accounting type program, where the user can further manage the information in any way, and in the ways identified in this invention.

In 2013, Microelectronics Technology Inc. (MTI) announced the release of the Mini Me RFID reader for Android 4.0 ICS operating system and an attachment for the Samsung Galaxy Nexus; the phone can be turned into an inventory control collection device. This is one of many add-on type devices which turn smart phones into RFID readers. In this instance, the invention provides that an RFID reader can either read the card information, including the specific identifier, or be programmed to notify the system that a copy of the transaction needs to be made in electronic format.

Thus, electronic cards may be read by stationary point-of-sale devices or smart/mobile devices, all of which are included in this invention, by virtue of each reading the information resident on the electronic card, tag, chip, or other readable device, related to the pre-selection or post-selection of the option for an electronic receipt.

Another element of this invention is that the consumer or person owning or being issued the card can enable preregistered electronic payment devices (such as credit cards, debit cards, reward cards and "smart" cards), through electronic payment equipment, usually known as "payment terminals" or "Point-of-sale" PoS terminals to "see" the unique identifier resident on the card. For the purposes of this invention, in a purchase transaction, a card in a retail or wholesale purchase transaction is typically issued by what is called an "Issuing Bank" or other card issuer, to a Cardholder.

Under this invention, any card which has memory containing information of any format is called an "electronic card" or "card."

With regard to purchases transacted with electronic cards, only about 1 percent of the more than 45,000 banks in the United States process credit card transactions themselves. Banks offer a great number of services, from checking accounts to mortgages, retirement accounts, and Cardholder loans, but credit card processing is not one of their core businesses. Banks often contract with outside companies, called "processors" or "providers" (like my Commerce Payment Systems) to handle credit card transactions. If a bank is within the 1 percent, then it acts as its own "Processor." Otherwise, the transactions are handled the same. While anyone in the processing chain, or a third party with permission to access the transaction history can provide the electronic receipt, in the instance a bank is a Processor, then it would typically have the relationship with the Cardholder to advertise and sell the features of the electronic receipt transfer of transaction information.

Although there are quite a few steps, set out here are the typical steps used in current card transactions. The purchase/payment transactions themselves are processed electronically in a matter of seconds through these basic steps shown following.

STEP ONE—In a typical face-to-face retail transaction, the Cardholder purchases goods and/or services from the merchant. An alternative to STEP ONE, is a person signing on to make an internet purchase through an internet store, like eBay, Amazon, PayPal or other internet card Processors.

STEP TWO—In the case of a point-of-sale purchase, the merchant or Cardholder slides the card through the electronic point-of-sale (point-of-sale) terminal, which reads the information off of the magnetic strip and transmits the transaction through a standard phone line to the "Acquiring Bank," a registered member of, for example, Visa, MasterCard, Discover, and/or American Express, each of whom have contracts with merchants to handle credit card transactions through their processing networks. These Processing Networks have policies for issuing credit cards and processing credit card transactions, and typically use Payment Card Industry ("PCI") Data Security Standards.

STEP THREE—The Acquiring Bank routes the transaction to a processor (a company hired by the Acquiring Bank to handle the transaction flow). The processor sends the authorization request to Visa or MasterCard. (Visa, MasterCard, Discover, American Express are examples of the worldwide payment service organization associations made up of "Issuing Banks," which issue credit cards to Cardholders, and "Acquiring Banks," which handle transactions for merchants.)

STEP FOUR—The Visa or MasterCard, Discover, American Express or like association Processors route the authorization request to the Issuing Bank for approval.

STEP FIVE—If the transaction is approved, it is "authorized" and the Issuing Bank transmits an authorization code back to the Processor association.

STEP SIX—The Processor association transmits the authorization code back to the Acquiring Bank.

STEP SEVEN—The Acquiring Bank sends the authorization code (or other response) to the merchant's point-of-sale terminal, which prints out a receipt that the cardholder signs. (The Issuing Bank then bills the Cardholder, and later, the Cardholder pays the bill.)

STEP EIGHT—At the end of each business day, the merchant transmits the total number of electronic transactions in a batch to the Acquiring Bank for processing and settlement.

STEP NINE—The Acquiring Bank monitors the batch of transactions. If no red flags come up, the bank releases the funds, which will reach the merchant's account in 48 to 72 hours.

In one aspect of the invention, the card has a specific and unique ecReceipt identifier stored on the magnetic stripe, chip, integrated computer circuit or other location where the information is identified and used by the reader and/or Processing software/hardware. Under this invention, the information sent to the Processor and/or, typically, but not restrictively, the Issuing Bank, also includes an identifying signal and/or code, which triggers any of the system's database to understand that the Cardholder wants a copy of the transaction sent via electronic copy, identical in amount and similar to that issued under STEP SEVEN in paper format.

The Electronic Copy of the Card Receipt ("ecReceipt") is then sent via, e.g., the internet, to the preregistered email or web address of the Cardholder, or is sent via the internet or private network to a database for further review and action.

Typically, the unique ecReceipt identifier on the electronic card would be read at the same time the card is swiped or the chip, memory, integrated computer circuit or other information is "read" by the PoS terminal to secure an Authorization.

When the Authorization is approved, the software/firmware interface from any of the participants, i.e., the Issuing Bank, Processor, Association, or Merchant Bank, processes the unique identifier on the card to understand that the transaction should be sent or held as an electronic receipt. The software/hardware creates an electronic copy of the receipt and attaches to the file any or all of the unique attributes associated with the transaction, such as time, amount, and location.

In other words, any of the networks involved would be triggered to create an electronic card receipt "ecReceipt(s)" of the transaction to the preselected email or web address, or other cloud or data storage site, for maintaining and/or forwarding, either electronically or otherwise, to the Cardholder or database, in electronic format.

The capture of the specific unique ecReceipt identifier may be identified, stored and/or processed under any of the STEPS above; however, to ensure that the transaction "settles," it would typically be that the software/hardware of the processor is set such that the creation, or at least the sending to the Cardholder of the electronic file and record of the transaction could be created under STEP SEVEN or STEP EIGHT, which is after settlement occurs and all parties understand that the transaction is complete.

However, the creation of the electronic receipt could be created at any time under the steps above or afterwards, and could occur at any point in the processing of the transaction. Likely, this would also depend on who is providing the electronic receipt service to the Cardholder, the Issuing Bank, the Processor, the Merchant Bank, the Merchant, or some third party associated with any of the above.

As with smart phone and smart device users, any of the entities which control the database information which created the electronic "receipt" for the Cardholder, could use the email or other address for the sending of alerts, instructions, or advertising, if the Cardholder selects when registering his or her email. In this fashion, an Issuing Bank, for instance, could reward the Cardholder with electronic or other credits, to entice that Cardholder to enroll in any general or specific advertising campaign, or just to receive ads that the Issuing Bank sponsors or approves, or which the Cardholder approves.

Similarly, with regard to items like medical purchases, or in conjunction with a medial visit, a Cardholder's card could be swiped and information from that transaction can be electronically sent to a medical insurance provider, or MEDICARE or MEDICAID. Thus, the Cardholder and the insurance provider could receive an electronic copy of the transaction, along with such medical information as is available to the reader and is necessary. In this aspect of the invention, if a Cardholder is subject to a deductible, the insurance provider would electronically receive information about a medical purchase, which would then be automatically credited towards the deductible amount.

In the example of the eDriver's license or a smart driver's license, the card's unique identifiers could be preselected to send information and/or alerts to the State and/or County officials, as well as the driver's license holder. The same would be true of eHealth cards, or ID cards, or ePassports, any of which could be configured to have identifiers that specific readers would read for further electronic processing and sending of electronic information to one or more entities.

Thus, persons from a country in strife could be issued visas which are cards or a smart card, or any of the type cards mentioned in this invention, whereby when the reader reads the card, all of the information and history on travel within locations using the reader can be pulled up, either in real-time or later, from the database for review and action, if necessary.

In addition, for instance, all persons who are in the United States by visa, could be issued electronic swipeable visa cards, whereby once each month, they must report to a "reader" location, swipe the card which would report to the Immigration authorities the location and other information embedded on the card, or accessible by a reader, like for instance, a current photograph and/or fingerprint of the visa card holder. This information would be logged into a database accessible and usable by the appropriate authorities.

In another aspect of the invention, the electronic receipt would not be emailed to the Cardholder, but maintained or sent electronically by the Processor, Issuing Bank or any connected networked party, or a third party service provider who has permission from the appropriate parties, usually including the Cardholder, to gain access to the information processed from a transaction. This information would be maintained in a database which could be accessed by the Cardholder or the Card issuer, or with appropriate permission, other parties either connected or involved with the transaction or not. In addition, the information could be sent, not to the Cardholder's email, but to a specific database, like a subscriber database service, where the electronic information could be accessed either for free or for a fee, to the electronic receipts. In this case, the Cardholder would maintain an account as a subscriber to the services; and log on to or into the subscriber service in order to retrieve the electronic receipt information.

In this invention, when the term "swiped" is used, it also means any other contact or contactless method in which a card provides information to a reader. In addition, when used for this invention, the term "Cardholder" is interchangeable with Card Issuer, when the Card Issuer has sufficient permission or authority to require that some or all of the information concerning any specific transaction should be accessible or sent to the Card Issuer, its divisions, affiliates, related parties, or its representatives or designees.

In addition, in another aspect of the invention, as transaction processing software already provides unique identifiers by merchant or otherwise, to determine and report if the purchase is for a hotel, a grocery purchase, or a purchase or a payment for utilities. The Cardholder, along with the Card Issuer and/or Processor, can enter into an agreement put into the software/hardware for the system to identify certain transactions/purchases to sending to multiple email addresses, or other locations or not. For instance, the reading and processing software interface can be programmed to include automatic selectors, by purchase type, date, or amount to send the information to different locations. In this way, items such as those normally associated with business travel, such as a car rental, a hotel bill or restaurant purchases, could be sent to the more than one email or other Cardholder selected address, or other location like a database.

In the same fashion, rather than an "opt in," an "opt out," or "required" methodology can be selected, and either reside on the card as preselected according to intrinsic attributes of the transaction, or be options existing in the processing software/hardware, or alternatively existing in the database. In this instance, under this invention, specific types of purchases are either selected or deselected for specific electronic handling. Thus, for instance, purchases of groceries or medical care would not be sent to multiple locations, or not sent at all; as such, these would be the "excludable" options. Alternatively, the Cardholder could select an "opt in," whereby certain types of transactions, and those only, are sent to the Cardholder's email, other address or database, or other location.

In another embodiment of the present invention, the information collected as an electronic receipt may also be accessed through direct access and transfer, not over the internet, or within a private network, like a download from one computer to a thumb drive, or other computer or electronic storage device.

The collected and selected information relating to a transaction may also be saved in a database for further manipulation. Under this aspect of the invention, and in any and all of these cases herein, the software/firmware connected to the reader and/or the processing software/hardware, can be "dropped" into a preselected set of accounting type formats, like a format that one would be familiar with in QuickBooks®, Google® Spreadsheets, Google® Tax Forms, or Google Docs, Sheets, and Slides.

In this aspect of the invention, the electronic transaction information initiated by swiping the card, is maintained in electronic format in a database and then will, either automatically, or according to the Cardholder's request, drop into and populate a predefined accounting format, which contains typically the name of the merchant, the transaction date, perhaps the settlement date, the type of purchase, the amount, the amount of tax separately from the total amount, the amount of tip separate from the total amount and other intrinsic attributes of the transaction which have or can be captured during the transaction. The resulting electronic transaction information, now contained in an accounting format, can be manipulated by the Cardholder or third party. Here, the populated accounting type software will permit the Cardholder the ability to then cut and paste full or partial transactions and reposition them, either from category to category or line to line, or similar repositioning. Thus, the Cardholder is provided a way to receive and manipulate the information much as they would in an accounting program.

In addition, by selecting, under a scheme like electronic cut/copy and paste, the Cardholder, accessing one or more of the electronic ecReceipt in the accounting database format, could select certain of the receipts/expenditures for populating other accounting type forms, for instance, a preformatted expense report. This would permit the Cardholder to access the electronic ecReceipt data (or other transaction data which was sent electronically) and create an expense report of just the transactions which mate with a particular business trip.

Likewise, the electronic receipt information can be manipulated to be electronically selected to populate a portion of an electronic tax return, or other electronic accounting program.

In another aspect of the invention, whether with purchases or other transactions like traffic tickets, one or more unique ecReceipt identifiers are recorded on the card, in places as shown and set out below, by example, not by exclusion, where the card may be used to alert the transaction processing software/hardware that the information available from the transaction is to be categorized by unique attributes, such as time of transaction, type of transaction, amount of tax versus total, amount of tip verses total, total amount, location of purchase, type of merchant, type of payment, and the like; and be enabled to sort on the corresponding electronic receipt or record of the transaction sent to the predetermined email of the Cardholder, or a third party database, which the Cardholder could access. In these instances, the software at the database providing the information to the Cardholder could sort by any selected or preselected Cardholder criteria for segregation and further manipulation or use according to the unique attributes.

Thus, in another aspect of this invention, as another example out of multitudes of ways this information resident on the card which interfaces with the processing software/hardware could be accessed, automated and/or used, is that parents who are maintaining accounts for their college students, could pre-enroll and either elect or not elect to receive electronic copies of every transaction receipt, as elected to be sent to (the parents') secondary email (exclusively, or in addition to the college students' email). This invention also describes how the parents could also enroll to receive alerts or receive the entire transaction involving any selected intrinsic attribute criteria. For instance, those parents could either get the receipt or an alert which would permit the parent to accept or deny the transaction, if the card was about to be used for the purchase of, for instance, liquor, or if someone was using a card for something like gambling, an entity with permission could receive a notice prior to the completion of a transaction, in the methods as set out herein, and would have the opportunity to deny the transaction prior to it being approved by the Issuing Bank or other entity in the process system chain.

The information and control available with the specific identifier can either be shared with the Issuing Bank or others in the processing system network, or kept confidential.

In addition, an electronic message, like a text sent to a mobile phone, laptop, tablet or computer, can be selected either with the original signal identifier, or with another one, which would notify another party, like a parent having a mobile phone, to request permission for approval or denial, which could be sent via the mobile device. In another embodiment of the invention, an internet or private network connection to any computer like device can serve the same purpose to permit a third party to either approve or disapprove the transaction. In an alternative of the invention, a preselected unique attribute, like an amount, location, or type of sale, can be selected so that the sent and received request for denial can be authorized or denied based on the selected intrinsic attribute of the transaction. For instance, a company's truck driver using a card for fuel and other purchases when being processed would issue the unique specific identifier, which would mandate that the transaction be signaled to another party, say the company CFO, who would then have the option of approving or denying the transaction, based on factors like the person connected with the card, location of the transaction, amount or other intrinsic attribute, thus reducing fraud and improving security. In another aspect of the invention, the information concerning the "ping" to approve or disapprove the transaction can also be downloaded to an email or other address, as described herein, including being downloaded to an automated Purchase Order database, or other accounting or other database which can then be used by the company, in this case.

In another aspect of the invention, the unique signal identifier can also be preselected by the Cardholder or his bank to roll over to another account if there is insufficient funds in the exact account that the card is tied to. Here, the one or more unique specific identifiers provide more than one level of approval, so that not only does the Issuing Bank have the opportunity to approve or deny a transaction, but the Cardholder has the opportunity to approve a transaction, providing an additional level of security.

Likewise, other unique attributes could be tracked in purchase or non-purchase swipes of the card. For instance, if certain medical procedures are paid for at one level, say at an 80% reimbursement, and others are paid at a lessor or greater amount, the terminal processing the payment can also include a unique ecReceipt identifier in the transaction which would automatically notify the insurance provider that the amount, as well as the type of medical service provided, are the correct amounts of deduction, and application to payment of the type of service could be automatic, and automatically received by email or access to a database by the insurance provider.

This qualification information is shown by reference to medical payments, but can be used in virtually any and every instance where the transaction can record some specific usable information, in addition to the amount of the transaction to be used by the system to send electronic information to specific entities for processing according to their rules, regulations, laws, standards, or contractual agreements.

Also, in this fashion, the database could automatically record, store and make available the amount of tax or taxes associated with one specific transaction, or all transactions together. This would be beneficial for deductions on income tax returns.

In another aspect of the invention, information electronically sent about the transaction could be electronically sent to a Cardholders' CPA for recording and use.

In the case of a medical or eHealth card, the same would be preregistered and connected to a specific Cardholder's email or web address, or other internet accessible address. Then billing, payments, and even medical reports could be communicated electronically. The medical or eHealth card could also have unique ecReceipt identifiers on the card which permit or restrict other persons (like someone assisting in an elderly person's medical care) or health care provider to also receive information electronically. For instance, every time a patient visits his cardiac doctor, the card would be swiped and the medical treatment associated with that appointment could be automatically shared with the other health care providers whose emails or web addresses are listed on the card. In this fashion, by just swiping a card, the patient and his entire medical team could receive an electronic copy of the updated medical information, each having preregistered their information in a manner so as to be uniquely identified by the reading or swiping of the card.

The system reading the card would then capture the digital medical information and send it to those preregistered health care providers, insurance companies, or other persons assisting the patient. As a part of the registration, when the card is issued or updated, HIPPA compliances would be enacted.

Or, in the instance of State issued assistance cards, food stamp users could, under this invention, receive an electronic copy of their merchant transaction.

In another aspect of this invention, for instance, a police officer, stopping a person for a moving violation, could swipe their eDrivers license with his remote "reader," which would then electronically record the ticket with the authority the officer represents, such as a City, or County, in which case the information would typically go to either the City Clerk or the County Clerk. The information could also be electronically sent to the State Driver's License Bureau, where such things as points against a person's driver's license are tracked, as well as electronically send the ticket or violation to the mandated registered email of the Cardholder/Driver, and perhaps the regulating Court, as well.

In the same fashion, entities like contractors, plumbers, electricians, Registered Physical Engineers, or like persons/companies who must seek a license or specific permit for things like construction, repairs, or modifications, could be issued a card, which is tied to a specific registered email or web address of the person seeking the license or permit. Then, if an inspector finds that such person should be issued a citation or violation, it would be automatically electronically sent to the permit issuing authority, as well as the Cardholder and any other entity which is preregistered with the information stored on the card.

In this fashion, easy tracking of multiple violations, dates and timing of the violations would be converted to electronic files, and the need for retention of paper files would diminish. One can easily see the benefit to a County or State authority to have all permits and associated violations recorded and sent electronically to the necessary persons or entities and be stored in a database. One such use would be enhanced search and organization in the electronic database, as well as guarantee of notification to the Cardholder.

The invention more specifically is that a person holding a card signs up or agrees with the Issuer Organization, usually a bank, (who would also typically have a similar agreement with the Processor and Acquiring or Merchant Bank), to have the card issued to the Holder be connected to an email address or other electronic location via its recordation on the card itself. Any way that a unique ecReceipt identifier can be encoded and then read at a terminal is acceptable under this invention.

In the case of magnetic strip cards, this is how it works: After the Cardholder or the cashier swipes the credit card through a reader, the electronic debit/credit software at the point-of-sale terminal dials a stored telephone number via a modem to call an acquirer. An acquirer is an organization that collects credit authentication requests from merchants and provides a payment guarantee to the merchant.

When the acquirer company gets the credit card authentication request, it checks the transaction for validity and the record on the magstripe for: Merchant ID; Valid card number; Expiration date; Credit card limit; Card usage.

By swiping or reading the card, the terminal, software and database understand that the Cardholder has selected that he/she/it receives an electronic copy of the transaction, which would be electronically and automatically sent to the preregistered address. If track three on the magnetic strip isn't used, then one of the discretionary locations on either track one or track two of the existing magnetic strips would be enabled at issuance of the card and be "read" by the swiping or reading equipment to understand that the selection of receiving an electronic receipt had been selected by the Cardholder and would be sent to the pre-registered address.

In a similar fashion, if a chip or other circuit is "read" by a terminal or reading device, then there would be a field unique to the selection of the option to obtain an electronic receipt maintained in such a fashion that it could be read by the chip or other reader, which would then signal the associated processing software and database to create an electronic copy of the transaction, building or creating the same from the information from the electronic transaction information, to be sent electronically to the preselected email or other address. There are generally three tracks on the magstripe.

In a magstripe card, each track is 0.110-inch wide. The ISO/IEC standard 7811, which is used by banks, specifies the following:

Track one is 210 bits per inch (bpi), and holds 79 six-bit plus parity bit read-only characters.

Track two is 75 bpi, and holds 40 four-bit plus parity bit characters.

Track three is 210 bpi, and holds 107 four-bit plus parity bit characters.

In addition, the unique ecReceipt identifier can reside in either Track 1, 2 or 3, or be included in or in addition to the card number, a new number on the card, or the card PIN or security code, just to name a few of the multiple ways the specific identifier could be recognized.

For instance, in the case of magnetic stripe cards, since track three is virtually unused by the major worldwide networks, it could be used as a designator to identify that the Cardholder has signed up for the electronic receipts by using some or all of the available information storage. The PoS terminal hardware, in the case of a point-of-sale purchase, would read this information and software resident in either the PoS terminal or at the Processor, or Association, or Bank level could decode this information to then create an electronic copy of the transaction to send to the Cardholder's email or other address. The unique ecReceipt identifier read by the software, wherever located, can match card number, Cardholder name, address, and other verification information, typically already on the card.

The stripe on the back of a credit card is a magnetic stripe, often called a magstripe. The magstripe is made up of tiny iron-based magnetic particles in a plastic-like film. Each particle is a really very tiny bar magnet about 20 millionths of an inch long. The magstripe can be "written" because the tiny bar magnets can be magnetized in either a North or South Pole direction. The magstripe on the back of the card is very similar to a piece of cassette tape fastened to the back of a card. Instead of motors moving the tape so it can be read, your hand provides the motion as you "swipe" a credit card through a reader, or insert it in a reader at the gas station pump.

Further, the type of card issued itself, or the issuer, can also be the triggering information to the reader and processing system to create an electronic copy of the transaction for further use. For instance, Google, Capital One, Credit One, and/or Driver's License bureau or other card issuer could issue credit/debit or other type cards, which by virtue of their card issuer's number, would trigger the processing system to identify that an electronic copy of the receipt is to be created for further sending, storing and/or use. In this way, the above examples are for reference, but are in no means limitations, which are virtually endless.

Thus, typically, on a magstripe card, the information on track one is contained in two formats—A: which is reserved for proprietary use of the card issuer where the ecReceipt email and/or command for the unique ecReceipt identifier could reside, and/or B: which includes several sectors for discretionary data.

The specific unique ecReceipt identifier, which would be read by the terminal device, and related processing software/firmware, is then recognized as this unique ecReceipt identifier, which will trigger the processing system, either at the Processor level, Issuing Institution level or any other connecting network level, including a third party who interfaces for the specific purpose of collecting the electronic data for storing or forwarding to the Cardholder's email, to create an electronic copy of the transaction. For instance, under Track one there is an (IATA) sector where up to 79 ALPHA 7-bit (including parity) characters (alphanumeric) are programmable, including SS, ES and LRC.

Under this track their bank and other required information, including information reserved for use by ANSI Subcommittee X3B10, and characters N-Z which are available for use by individual card issuers. This is one place which could retain the specific identifier to trigger an ecReceipt to be created. These instances are by way of example, and are by no means exclusive, as there are multiple discretionary or other locations, which are not currently in use, or where the use can be modified, where the ecReceipt specific identifier can be located for reading and processing.

Nor does the above list show all of the examples. For instance, typically, the PIN is not printed or embedded on the card, but is manually entered by the Cardholder during automated teller machine (ATM) transactions and in "card not present" transactions, such as over the Internet or for phone banking or purchases. It is also increasingly being made available as an optional method of cardholder authentication for point-of-sale (card present) transactions using debit cards or credit cards, the other being by signature. Thus, the unique signal identifier may need to be resident on more than one location on a card or in the card records within the system. For instance, in the instance of an internet purchase, a PIN could include the specific identifier, either as a part of the existing PIN system, or as an added alphanumeric or similar code, which the system would recognize to understand it needs to create an electronic copy of the transaction for further handling, sending, or storing. In another embodiment of the invention, if a person used his/her special identifier PIN, Security Code or other code, the system would understand to automatically create an electronic copy of the transaction. In another embodiment, the type of card, transaction, location, amount, or other intrinsic attribute, would be the indicator to the system that an electronic receipt needs to be created.

In this instance, the intrinsic attribute can be the signal to create an electronic receipt. For instance, if the merchant was a food merchant, that indicator would be the unique specific identifier which would cause the processing system to create the electronic receipt for further handling according to these disclosures.

In another embodiment of the invention, the security code can contain the specific identifier, or another code system, like the PIN or Security Code can be used, so that in voice or internet transactions, the specific identifier is present and transmitted so that the system understands it needs to make an electronic copy of the transaction for further handling, as disclosed herein, or the type of instruction issuing the card, the Processor, the Merchant, the Acquiring Bank, or any of the named and recorded parties to a transaction can be used to identify that an electronic receipt needs to be created for further handling.

In the case of other memory or microchips, a host of locations exist for this electronic instruction to be housed, which can be read by the point-of-sale reader, or other reader. In addition, another alphanumerical or code word designator can be affixed to the card which could be interpreted by use by plugging in the information online for internet sales, and/or spoken, or read over the phone system when a Cardholder is calling the card information in.

In addition, a credit/debit card typically uses only tracks one and two. Track three is a read/write track (that includes an encrypted PIN, country code, currency units, amount authorized), but its usage is not standardized among banks. Thus, another place the unique ecReceipt identifier for this invention could reside is in Track three. While the unique ecReceipt identifier could reside almost anywhere a reader can read, other typical places would include the card number itself, a unique ecReceipt identifier associated with the Cardholder's name, PIN, country code, currency units, and amount authorized, to name a few. In Track one, there is a track, IAI: Individual Account Identification, up to 12 digits, where the unique specific identifier can reside. In addition, there is a field, NM: Name, which permits from 2-26 characters, where the specific identifier can be located. These locations for the unique specific ecReceipt identifier is by way of example, as there are numerous discretionary locations within a typical card's magstripe where the notification that an electronic copy of the receipt is to be created and sent to the designated email, or storage location.

Likewise, the reader and combined processing software can be encoded on the card in any readable location available wherewith the reader would "read" this information and pass it along to the processing software/firmware, so that the identification and acknowledgment of the obligation to provide ecReceipt email are noted and processed. Likewise, the unique ecReceipt identifier in any of the other categories are contained on either Format A or B on Track one.

For instance, since Format B of Track 1 contains enough space for up to 19 characters, and most debit and credit cards only use 16 numbers to identify that specific card, one or more of the remaining character spaces could be utilized for letting the reader and processing software know that this transaction is the type which needs to be sent in electronic format via email, or other internet addressable site. In addition, since most names do not exceed 26 characters, this is another place the unique ecReceipt identifier, recognizable by the reader and the processing software, could use to let the processing network system know that an electronic version of the transaction needs to be recorded and sent to the pre-selected email or web address.

The same is true for a virtual terminal for internet payment, purchase, or other transactions. In this case, the card number itself could have an extension for identifying that an electronic ecReceipt of the transaction needs to be sent to the preregistered email or other location, as mentioned. The Cardholder could also visit the Issuing Authority's location or website to have the information placed or associated with the card, or it can be included in the database updated with a new email or other address. This could be accomplished by changing the information resident on the card, or more likely the information which signifies that the Cardholder has elected to have transaction information sent in electronic format, would stay the same, and the database which reads or is enabled by the unique ecReceipt identifier on the card would be updated, through, for instance, the Cardholder going online to change his/her/its email or other address.

In each case, the election of the Cardholder to receive electronic payment receipts would reside in some format on the card itself, whether within the magnetic stripe, a chip or circuit, which would cause, through the existing software and database, and transaction enablement, an electronic copy of the transaction to be sent to the predetermined email or other location selected by the Cardholder.

In another aspect of this invention, a third party service provider would maintain the database for the Cardholder, Issuing Bank, Acquiring Bank, Merchant, Processor, or Association.

The electronic ecReceipts would then be available and accessible through the internet, or a wire or wireless system, whereby, when the card is swiped or read by the payment terminal, an exact or similar electronic copy of the transaction, together with any returns, re-runs or re-rings, are set to be created into an electronic file of the transaction. This electronic file of the transaction, which is like the paper transaction which is typically printed out under Step Seven above, is automatically identified by the payment terminal PoS equipment software and hardware, and/or the Processor's equipment, database and software, and/or either the Issuing Bank or Acquiring Bank's equipment, data, and/or software, which creates the electronic copy, checks it against the Cardholder's other card information for accuracy and security. The processing system then sends the ecReceipt to the Cardholder's email address or other internet, wire or wireless accessible location, or a device selected by the Cardholder.

In the case of the magnetic stripe card, one of the locations within the magnetic unique ecReceipt identifiers would be "turned on" within the stripe when the Cardholder signs up for, or agrees to the electronic receipts. In the case of a chip or smart card, the email would be stored within the pre-recorded information within the readable memory resident in the card which would, when read, trigger the payment terminal to create an electronic file of the transaction, which would be sent to the email or other location described herein.

In this way, every time a Cardholder makes a transaction, he does not have to rely on the paper that is printed out, because an exact or similar electronic copy is emailed to his database or email, or other location for his electronic use and further manipulation.

In general, the invention teaches that a person can either use their standard email, or sign up to a special email which is connected to a database where the email with the transaction information is automatically dumped for further processing. This further processing would be to put, for instance, all restaurant expenses into one category. Similarly, all rental car electronic receipts would go to another category, while groceries, pharmacy and other expenditures would each be placed with other receipts which correspond with like categories.

In the case of sound activated processing, a specific sound can be programmed in where the sound would be read by the sound reader to understand that an electronic copy of the transaction needs to be made and made available in accordance with the disclosures herein. At least one representation of at least one sound and the processor is configured to cause the sound-producing element to produce a sound corresponding to the at least one representation of the at least one sound when such representation is stored in the memory, responsive to the communications module interacting with the payment terminal to activate the sound or other unique signal identifier ecReceipt notice.

In another aspect of the invention, a visual re-orientation of the unique signal identifier can be programmed into a device. For instance, an exemplary payment device for interacting with a payment terminal includes a memory, a processor coupled to the memory, a communications module coupled to the processor and configured to interact with the payment terminal, and receive and recognize the visual-stimulus-producing element of the unique signal identifier which then is understood by the processor and processing system. A body portion is associated with the memory, the processor, the communications module, and the visual-stimulus producing element to create the unique signal identifier and communicate it forward. The processor is configured to cause the visual-stimulus-producing unique signal identifier element to produce a visual stimulus, responsive to the communications module interacting with the payment or other terminal in connection with a transaction An exemplary embodiment of a method of providing a service for payment device holders (which can be, at least in part, computer-implemented), according to yet another aspect of the invention, includes the steps of facilitating the Cardholders obtaining electronic devices configured according to a method for making a financial transaction card with embedded electronic circuitry which contains the unique signal identifier for the creation and processing of an ecReceipt.

Financial transaction and similar cards are fabricated with a split core adapted to receive embedded electronic circuitry where the unique signal identifier may reside. The card core has two or more laminated layers. The cavity is milled into one or more of the layers to receive the electronic circuitry which will contain the unique signal identifier for the ecReceipt protocol. A payment infrastructure standard having audio capability, and facilitating the holders obtaining representations of sounds to be stored in the memories can also be configured to have a sound associated with the command to create an electronic copy of the transaction for further processing. This could be used in the instance of processing card orders that are received over the phone, by fax, by either key entering the Cardholder's transactions, along with the unique specific ecReceipt identifier, into a credit card terminal, or by key entering the transactions into the virtual terminal online.

Elements of the Embodiments Generally: Exemplary embodiments of these systems and methods are described above in detail. The systems and methods are not limited to the specific embodiments described herein, but rather, components of the systems and/or steps of the methods may be utilized independently and separately from other components and/or steps described herein. For example, the systems may also be used in combination with other systems and methods, and is not limited to practice with only the system and method as described herein.

The processor, any computing device, or computer, such as described herein, may include at least one or more processors or processing units and a system memory. The gaming controller may typically also include at least some form of computer readable media. By way of example and not limitation, computer readable media may include computer storage media and communication media. Computer storage media may include volatile and non-volatile, removable and non-removable media implemented in any method or technology that enables storage of information, such as computer readable instructions, data structures, program modules, or other data. Communication media typically embody computer readable instructions, data structures, program modules, or other data in a modulated data signal, such as a carrier wave or other transport mechanism and include any information delivery media. Those skilled in the art should be familiar with the modulated data signal, which has one or more of its characteristics set or changed in such a manner as to encode information in the signal. Combinations of any of the above are also included within the scope of computer readable media.

The order of execution or performance of the operations in the embodiments of the invention illustrated and described herein is not essential, unless otherwise specified. That is, the operations described herein may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

In some embodiments, a processor, as described herein, includes any programmable system including systems and microcontrollers, reduced instruction set circuits (RISC), application specific integrated circuits (ASIC), programmable logic circuits (PLC), and any other circuit or processor capable of executing the functions described herein. The above examples are exemplary only, and thus are not intended to limit in any way the definition and/or meaning of the term "processor."

In some embodiments, a database, as described herein, includes any collection of data including hierarchical databases, relational databases, flat file databases, object-relational databases, object oriented databases, and any other structured collection of records or data that is stored in a computer system. The above examples are exemplary only, and thus are not intended to limit in any way the definition and/or meaning of the term "database." Examples of databases include, but are not limited to only including, Oracle® Database, MySQL, IBM® DB2, Microsoft® SQL Server, Sybase®, and PostgreSQL. However, any database may be used that enables the systems and methods described herein. (Oracle is a registered trademark of Oracle Corporation, Redwood Shores, California; IBM is a registered trademark of International Business Machines Corporation, Armonk, New York; Microsoft is a registered trademark of Microsoft Corporation, Redmond, Washington; and Sybase is a registered trademark of Sybase, Dublin, California.)

Under this invention when the term "card" is used, it means, without limitation, a debit card, credit card, smart card, prepayment card, or any and all of the other types of cards as are listed in this invention. Under this invention, when the designation Cardholder is used, it can also mean any other party to the transaction. Under this invention, when "reader", Point-of-sale ("PoS") "terminal," "processing system" and the like are used, it can mean one or more, or all of the elements which make up the entire card processing system, from reader device to the processing network, to the processing system software/hardware and include all the parties connected to the processing network. Under this invention, the unique specific identifier or specific identifier can be one or more identifiers to accomplish all the purposes set out herein. Such that one specific identifier can be used for one purpose, and another can be used for another purpose as set out and disclosed herein. Alternatively, a single specific identifier may be utilized to accomplish a set of determined or predetermined purposes. In addition, the specific identifier is typically used in connection with all the normal information sent and received at the time of a sale, whether a PoS or virtual PoS over the internet or phone.

In all cases where the term "network" is used to mean a network such as, for example, a local area network (LAN), a wide area network (WAN), dial-in-connections, cable modems, wireless modems, T1, T3, fiber, and/or special high-speed Integrated Services Digital Network (ISDN) lines.

In all cases where the term "internet" is used, the same also includes connections of any kind, including, but not limited to mobile connections, RF connections, Wi-Fi connections, WiMAX connections, personal hotspot connections, web connections, wire internet connections, and open or closed network connections. In addition, where the term "mobile" is used, this includes, but is not limited to, any device and method of connection and transfer of information over cellular connections, and includes, smart phones, phones, tablets, and any other device which can connect to a mobile and/or cellular network. Also, when the term "specific identifier" is used, it means any and all ways to create an understandable message which can be relayed to the processing system which creates a command to make an electronic copy or original of the transaction. When the term "transaction" is used, it means and includes, without limitation, purchases, transfers of funds, mobile payments, tickets, medical transactions, permits, permit violations, and all other type of transactions which are amenable to the uses, without limitation, of a card for a transaction.

When the term "mobile device" is used, it can also mean a smart phone, cell phone, tablet, laptop, computer, internet connect television/monitor or other data management and processing computer type device.

When the term "specific identifier" is used, the same can be one or more specific identifiers.

Techniques of this invention can be implemented, for example, via a computer-readable medium storing program code that executes inventive method steps, as described herein, and which communicate between a card or mobile wallet or typed in, spoken, or other sound output to a reader. The methods include an apparatus including a memory and at least one processor coupled to the memory and operative to implement inventive method steps. This invention can be made operable not only with magstripe cards, and smart cards, but also with bar code cards, or one-dimensional, two-dimensional, three-dimensional or color bar code cards, or any other known mechanism to transfer information.

Further, a system or apparatus can include means for carrying out one or more method steps; the means can include hardware modules, software modules, or a combination of hardware and software modules. These can be implemented by apparatuses including PoS readers, readers, mobile payment devices/apps, smart phones, phones, laptops, tablets and other connected devices. The electronic receipt copy (which also includes the original) exists with the steps of receiving the command, creating or extracting the electronic copy of the transaction, and then holding, storing, or sending the information.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Other aspects and features of the present invention may be obtained from a study of the drawings, the disclosure, and the appended claims. The invention may be practiced other than as specifically described within the scope of the appended claims. It should also be noted, that the steps and/or functions listed within the appended claims, notwithstanding the order of which steps and/or functions are listed therein, are not limited to any specific order of operation.

Although specific features of various embodiments of the invention may be shown in some drawings and not in others, this is for convenience only. In accordance with the principles of the invention, any feature of a drawing may be referenced and/or claimed in combination with any feature of any other drawing.

What is claimed is:

1. A system of managing electronic receipts, the system comprising:
  a credit/debit card including a chip including a data location for a first unique identifier including computer-executable instructions for generating a display of a graphical representation of an electronic transaction receipt;
  a point-of-sale system, the point-of-sale system configured to:
  register a plurality of goods and/or services, the plurality of goods and/or services comprising the electronic transaction receipt associated with a sale; and
  detect a payment through a user payment device;
  a unique identifier detection mechanism in communication with the point-of-sale system, the unique identifier detection mechanism configured to:
  detect the first unique identifier linked with the credit/debit card; and
  detect a second unique identifier linked to the user upon approval of the payment;
  a server computer in communication with the point-of-sale system, the server including:
  a server processor configured to register the display of the graphical representation of the electronic transaction receipt as a function of the first unique identifier; and
  a memory device configured to store a database with a plurality of receipt-data storage locations, each receipt-data storage location associated with a second unique identifier wherein, in response to the approval of the payment, the point-of-sale system forwards the second unique identifier and the electronic transaction receipt to the server processor and the server processor stores the display of the graphical representation of the electronic transaction receipt within the receipt-data storage location associated with the second unique identifier in a user accessible datafile; and a user computing device coupled to the server for displaying the graphical representation of the electronic transaction receipt to the user.

2. The system of claim 1, wherein each second unique identifier has more than one associated receipt-data storage location, wherein the server processor stores the transaction receipt within each associated receipt-data storage location.

3. The system of claim 1, wherein the electronic transaction receipt may be divided and cataloged into different categories of goods and/or services by the user within the receipt-data storage location accessible under a user profile by a user.

4. The system of claim 3, wherein the different categories indicate particular shopping characteristics related to the user in order to effectively sort all purchases.

5. The system of claim 1, wherein the database comprises a relational database and each receipt-data storage location further includes related user information, the server processor further configured to store the transaction receipt as a function of the receipt data information.

6. The system of claim 1, wherein the server processor is programmed to execute the steps of:

selecting a transaction receipt from the receipt-data storage location within the database;

generating a graphical representation of a receipt which will populate an expense report as a function of the transaction receipt within the receipt-data location; and attaching an image copy of the transaction receipt to the generated expense report.

7. The system of claim 1, wherein the server processor stores the display of the graphical representation of the electronic transaction receipt in a computer application accessible by a user using a corresponding user profile.

8. The system of claim 1, wherein the user computing device includes an interface operable to:

electronically receive a plurality of user graphical representations of receipts from point of sale transactions, each transaction associated with a respective user and associated with an application networking platform; and display a graphical representation of one of the receipts recovered from the point of sale device and matched to the profile of the on an electronic device.

9. The system of claim 1, wherein the user computing device includes at least one of a smartphone, tablet computer, and desktop computer.

10. The system of claim 1, wherein the credit/debit card includes a second data location including a card number.

* * * * *